(12) United States Patent
Dickover et al.

(10) Patent No.: US 7,648,020 B2
(45) Date of Patent: Jan. 19, 2010

(54) TRANSITION PLATE POSITION SENSOR FOR SAFE CHECK-OUT COUNTER CONVEYOR OPERATION

(75) Inventors: Scott Wesley Dickover, Raleigh, NC (US); Wesley Dale Dickover, Stuart, FL (US)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 12/041,064

(22) Filed: Mar. 3, 2008

(65) Prior Publication Data
US 2009/0218201 A1  Sep. 3, 2009

(51) Int. Cl.
*B65G 47/66* (2006.01)
(52) U.S. Cl. .................. 198/600; 198/502.1; 186/68
(58) Field of Classification Search .................. 198/600, 198/539, 502.1, 323; 186/68
See application file for complete search history.

(56) References Cited

U.S. PATENT DOCUMENTS

| | | | | |
|---|---|---|---|---|
| 2,536,961 A | * | 1/1951 | Smith | 186/68 |
| 2,569,711 A | * | 10/1951 | Foster | 186/68 |
| 3,853,212 A | * | 12/1974 | Downes | 198/572 |
| 4,401,189 A | | 8/1983 | Majewski | |
| 4,629,052 A | | 12/1986 | Kitamura | |
| 4,800,998 A | * | 1/1989 | Myrick | 198/323 |
| 5,424,534 A | | 6/1995 | Gordon et al. | |
| 5,584,373 A | * | 12/1996 | Layne | 198/464.4 |
| 6,241,070 B1 | * | 6/2001 | Loder | 198/323 |
| 2007/0023257 A1 | * | 2/2007 | Schiesser | 198/370.04 |

* cited by examiner

*Primary Examiner*—Mark A Deuble
(74) *Attorney, Agent, or Firm*—Cynthia G. Seal; Jeffrey L. Streets

(57) ABSTRACT

A transition plate assembly and a position sensor assembly are used to detect a dislodged or removed transition plate from a gap between the discharge end of a conveyor and the first end of a run-out ramp. The position sensor assembly may detect a safe seated position of a hinged transition plate protecting the gap and generate a motor-enabling signal to a drive motor that drives the conveyor. An interrupted motor-enabling signal, corresponding to an unsafe condition, may turn off the drive motor to prevent damage to articles or persons until an enabling signal is restored. In one embodiment, the termination of the power to the drive motor continues until a delay period has elapsed following the detection of an enabling signal.

9 Claims, 4 Drawing Sheets

TRANSITION PLATE POSITION SENSOR FOR SAFE CHECK-OUT COUNTER CONVEYOR OPERATION

BACKGROUND OF THE INVENTION

1. Field of the Invention

The present invention relates to the safe operation of conveyor systems, and more particularly relates to safety devices for conveyors used at a retail check-out counter.

2. Background of the Related Art

Conveyors having moving belts are commonly used in grocery stores, retail merchandise stores and in shipping and distribution centers to reliably move articles selected and deposited thereon to a destination, such as a clerk, a scanner or an accumulation area. Usually, a conveyor belt is a generally continuous loop of fabric or other pliable material extending from a first roller to a second roller so that when one or more of the rollers are rotated, such as by a motor, the vertically upwardly disposed top side of the belt provides a moving deck on which a handler or consumer may place articles to be shipped, distributed or purchased. The opposite, or bottom, side of the conveyor belt is usually parallel to the top side, but generally not visible to persons using the conveyor. A horizontal support surface, such as a table, is generally disposed intermediate the top side and the bottom side of the conveyor belt, intermediate the first roller and the second roller, to support the movable top side of the conveyor belt and the articles transported thereon.

The conveyor belt may be continually driven about its path around the first roller at an intake end and the second roller at a discharge end to provide a moving deck to support and transport articles placed thereon. The first roller is generally positioned at the intake end of the conveyor where the handler or consumer deposits the articles onto the conveyor, and the second roller is generally positioned at a discharge end of the conveyor adjacent, for example, to the top of a descending run-out ramp. At the discharge end of the conveyor, the incoming (indicating direction of movement relative to a person standing at the discharge end) conveyor belt bends around, and conforms to the circular exterior of the second roller. The conveyor belt wraps about 180 degrees on the first roller and also on the second roller, each time to reverse its direction of travel from the bottom side to the top side (at the first roller), or from the top side to the bottom side (at the second roller).

The run-out ramp may be a downwardly sloped surface comprising, for example, a sheet of stainless steel, a series of parallel tubular rollers or a plurality of parallel sets of wheels, each set of wheels having a common axle. Articles discharged from the discharge end of the conveyor onto a first end of the run-out ramp may slide or roll down the run-out ramp away from the first end, and accumulate at an accumulation area at or near the second end to await bagging, packaging, further processing and/or retrieval after a completed transaction.

There is generally a gap between the discharge end of the conveyor and the first end of the run-out ramp, and this gap can pose a hazard to articles or personnel. Articles packaged in loose fitting plastic or fabric bags, or in enclosures with loose or protruding portions, may become drawn into the gap between the discharge end of the conveyor and the first end of the run-out ramp, and these articles may become damaged or torn. Under unattended conditions, clothing, jewelry, fingers, hands or even long hair may become inadvertently drawn into the gap by the conveyor, thereby resulting in damage to articles or personal injury. To prevent damage to articles or injury to persons, the gap between the discharge end of the conveyor and the first end of the run-out ramp is generally bridged by a transition plate seated within the gap to prevent articles from being drawn into the gap between the second roller of the conveyor and the adjacent first end of the run-out ramp. The transition plate is generally removable from its seated position within the gap to enable the removal of articles or debris that may be drawn into the gap or trapped under the transition plate.

Many check-out counters are unattended, and others are loosely attended by untrained personnel that may not appreciate the danger of damage to articles or injury to persons that can occur if articles are drawn into the gap. In some cases, the transition plate may not be promptly and safely restored to its seated position, thereby increasing the chances of articles being drawn into the gap adjacent to the second roller of the conveyor.

Conventional transition plates may be secured within the gap using fasteners or other devices to prevent unseating and/or removal. A transition plate may be secured in the seated position using fasteners, such as screws, but these may be time-consuming to remove to free articles that may be trapped between the transition plate and the conveyor belt. These types of transition plates may become lost or misplaced after removal. Alternatively, a transition plate may be hingedly attached to the check-out counter to prevent removal of the transition plate from check-out counter. A hinged transition plate may be pivoted from its seated position to a removed position to allow an attendant to remove articles or to clear debris, and then pivoted back to the seated position for resumption of operations. This prevents the transition plate from becoming lost or misplaced. However, if a hinge is positioned to pivot the transition plate upwardly from the gap and toward the conveyor, rather than upwardly from the gap and toward the run-out ramp, the hinge can actually exacerbate the hazard by creating a narrow pinch point between the transition plate and the discharge end of the conveyor upon pivoting of the transition plate from its seated position.

Other conventional transition plates may be retained within the gap using spring-loaded retainers that will, upon being subjected to a sufficient dislodging force, surrender the transition plate from its seated position when the dislodging force exceeds the retention force of the spring(s). For example, spring-loaded retainers for holding the transition plate in its seated position between the conveyor discharge and the run-out ramp may become damaged, broken or detached, and the transition plate may become insufficiently seated within the gap. This can cause a larger opening between the discharge end of the conveyor such that the transition plate will catch on or trap more articles and present a greater danger personal injury.

In some designs, such as the spring-loaded retainer embodiment discussed above, the transition plate may be retained in its seated position within the gap in a manner that allows it to break-away and dislodge by an unseating force applied as if by an article caught between the conveyor belt and the transition plate. The problem with these transition plates and related retainers is that the conveyor may continue to operate so that, if an article is already trapped or drawn into the gap, the conveyor might continue in motion, pulling the article further into the gap and causing possible damage, and making it much more difficult to rectify.

An attempted solution to the above-referenced problem provides a mechanically operated switch to interrupt the power source to a drive motor that drives the conveyor belt about the first roller and the second roller. A mechanical switch may comprise a portion that is displaced to engage a switch and, for example, close an electrical circuit to the motor, when the transition plate is in its seated position within the gap. However, these mechanical switches may be easily overridden or compromised by inserting an object to hold the switch in the closed position.

BRIEF SUMMARY OF THE INVENTION

One embodiment of the invention provides an apparatus comprising: a transition plate to cover at least a portion of a gap between a motor-driven conveyor and a run-out ramp; a hinge coupled to the transition plate to allow pivoting of the transition plate between a seated position substantially covering the gap and an unseated position providing access to the gap; a fin plate extending from a bottom side of the transition plate, the fin plate having an aperture there through; a light emitter and a light detector positioned in a stationary spaced-apart relationship on opposing sides of the fin plate and aligned to emit and detect light through the fin plate aperture only when the transition plate is in its seated position, and wherein the fin plate blocks the path between the light emitter and light detector throughout the range of hinged motion of the transition plate; and a signal generator coupled to the light detector for sending a motor-enabling signal while the aperture is positioned between the light emitter and the light detector.

DETAILED DESCRIPTION OF THE INVENTION

Figure 1:
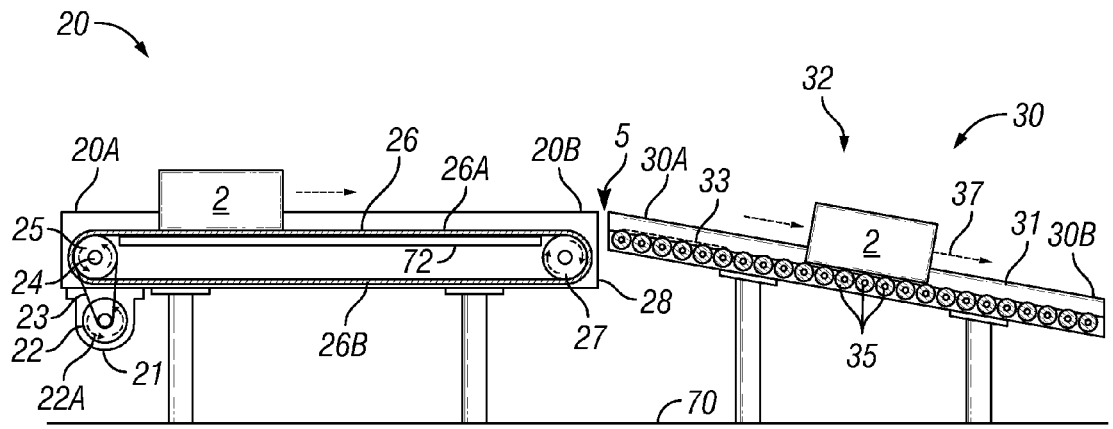
FIG. 1 is a schematic side view of a conveyor, an adjacent run-out ramp and a gap intermediate the discharge end of the conveyor and the first end of the run-out ramp.

One embodiment of the invention provides an improved transition plate to bridge the gap between the discharge end of a conveyor and the first end of a run-out ramp. The transition plate cooperates with a position sensor to ensure that the conveyor does not run unless the transition plate is securely in its seated position. A fin plate with an aperture cooperates with a photo-sensitive position sensor to detect whether the transition plate is seated. Preferably, the improved transition plate is hingedly coupled to a bracket suitable for attachment to the run-out ramp, conveyor frame or check-out counter.

Another embodiment of the invention provides a light-detecting position sensor that cooperates with the hinged transition plate. The light-detecting position sensor comprises a light emitter, a light detector, and a signal generator coupled to the light detector to send an enabling signal in response to the light detector detecting light from the light emitter. The enabling signal may be used to enable a motor to drive the conveyor belt about its path over the first roller and the second roller. The light emitter and light detector may be secured in a spaced-apart and aligned relationship to receive and cooperate with the apertured fin plate extending from the bottom of the hinged transition plate. The fin plate contains an aperture strategically positionable by pivoting movement of the hinged transition plate so that, when the transition plate is properly seated in the gap between the discharge end of the conveyor and the first end of the run-out ramp, the aperture is aligned between the light emitter and the light detector to transmit light from the light emitter through the aperture and to the light detector. In response to detecting light from the light emitter, the signal generator may generate an enabling signal to enable the conveyor-drive motor to operate the conveyor and to drive the conveyor belt about its path. Preferably, the fin plate extending from the bottom of the hinged transition plate is curved or otherwise strategically shaped to position a non-apertured portion of the fin plate to substantially block light from the light emitter from reaching the light detector at all possible positions of the transition plate other than the seated position. When the transition plate is in the seated position, however, the aperture in the fin plate is aligned to transmit light there through from the light emitter to the light detector, and to thereby activate the signal generator to generate an enabling signal to the drive motor.

A further embodiment provides a transition plate hingedly coupled to the first end of the run-out ramp, which may form a portion of a check-out counter, in order to pivot between a seated position and a removed/unseated position. In this embodiment, the transition plate will open upwardly from the gap and away from the discharge end of the conveyor to open the gap without creating a pinch point that may trap or crush articles that may be inadvertently drawn into the gap. The hinged transition plate pivots to a seated position within the gap to allow articles to pass across its top side without impeding smooth movement of the articles transitioning from the discharge end of the conveyor onto the run-out ramp.

The transition plate and the position sensor are preferably removable using fasteners, such as screws, to facilitate maintenance of the conveyor and related equipment, but to prevent unwanted removal of the pivotable transition plate by untrained attendants or users. For safety reasons, the position sensor should operate so that the conveyor belt should be immediately and automatically disabled when the transition plate is removed or even dislodged from its seated position.

Yet another embodiment provides an apparatus, as described in the foregoing embodiment, including a signal generator that may generate an analog or a digital signal to the drive motor or, in an alternate embodiment, to a processor that manages the drive system of the conveyor. For example, the signal from the signal generator may be an analog or a digital input to a processor using a logic sequence in conjunction with a control module to detect an interruption of a very short duration, also called a "false opening," and to continue to generate the enabling signal until the light detector fails to detect the light emitted from the light emitter for a specified duration. Accordingly, this system prevents the conveyor from being disabled by a small amount of debris falling through the space between the aperture and the light emitter or the light detector, and only temporarily impairing the detection of light by the light detector. As another example, a processor may delay a reactivation of the conveyor for a set duration after an unsafe condition has just cleared and a safe condition is determined to exist. For example, but not by limitation, if an article is drawn into the gap and if the transition plate is unseated, and the conveyor is disabled by movement of the aperture away from its aligned position, removal of the article and restoration of the transition plate to its seated position may immediately cause light to again be detected at the light detector. However, in order to prevent a rapid on-off-on sequence from damaging the conveyor, the processor may impose a delay of two or three second before sending the analog or digital enabling signal to the conveyor motor.

The use of the present invention provides enhanced safety for consumers and operators of check-out counters through immediate detection of transition plate removal or dislodgement, and through automatic disablement of the motor that drives the conveyor belt. The transition plate may be secured to the check-out counter and operated in a manner to provide fail-safe operation; that is, in the event that any component of the apparatus fails, such as, but not limited to, the light emitter, the light detector or the signal generator, the motor that drives the conveyor is disabled until the defective component is replaced or repaired.

The method of the present invention provides a rapid deactivation of a conveyor. For example, a conveyor may be provided with an infra-red light emitting diode, an LED detector and a connected signal generator, and may therewith generate an enabling signal indicating a safe condition, and the signal generator may be used to direct the enabling signal to a processor that may, in response to receiving a signal indicating an unsafe condition, interrupt the power supply to the conveyor. An associated transition plate may be hinged from a mounting base or bracket to pivot between a seated position and at least one unseated position.

A still further embodiment includes a light absorbent material disposed on interior portions of the gap or region between the light emitter and the light detector. For example, flat black paint may be used to reduce light reflections within the area in which the light detector is positioned in order to prevent inadvertent activation of the drive motor by the detection of ambient light.

The following is a description of a preferred embodiment of the transition plate assembly having a position sensor to detect removal and/or dislodgment of the transition plate from a gap intermediate the discharge end of a conveyor and the first end of a run-out ramp.

FIG. 1 is a cross-sectional elevation view of a conveyor 20 supported by a frame 28, the conveyor having a first, intake end 20A and a second, discharge end 20B in a spaced-apart relationship to the first end 20A. The conveyor 20 further comprises a conveyor belt 26 movable about a path within the frame 28 about a pivotally supported first roller 25 and a pivotally supported second roller 27. The first roller 25 of FIG. 1 comprises a drive pulley 24 that is driven to rotate along with the first roller 25 by a drive motor 21 coupled to rotate the drive pulley 24 and the first roller 25 through drive belt 23.

The conveyor belt 26 may comprise a fabric or other compliant or pliable material. The conveyor belt 26 has, at any given position, an upwardly disposed top side 26A and a downwardly disposed bottom side 26B. Articles 2 may be placed on the top side 26A and supported thereon by a table 72 disposed within the frame 28 of the conveyor 20 intermediate the first roller 25 and the second roller 27, and intermediate the top side 26A and the bottom side 26B of the conveyor belt 26. Articles 2 placed on the first, intake end 20A of the conveyor 20 may be transported by powered movement of the conveyor belt 26 to the second, discharge end 20B of the conveyor 20 for scanning or other processing by a clerk or attendant.

The run-out ramp 30 may comprise a first end 30A and an accumulation area 30B in a spaced-apart relationship to the first end 30A. The run-out ramp 30 may comprise a descending ramp 32 disposed intermediate the first end 30A and the accumulation area 30B to deliver, under the force of gravity, articles placed on the first end 30A of the run-out ramp 30 to the accumulation area 30B of the run-out ramp. The run-out ramp 30 may comprise a plurality of generally parallel, tubular rollers 35 pivotally secured within the frame 31 of the run-out ramp to facilitate the gravitational movement of articles 2 placed thereon. Other embodiments of a run-out ramp 30 may comprise a plurality of wheels or a smooth downwardly inclined surface on which articles 2 may slide from the first end 30A to the accumulation area 30B. The run-out ramp 30 may comprise a generally constant pitch 33 or slope to cause the weight of the article 2 placed on the run-out ramp 30 to move the article 2 in the direction of arrow 37 toward the accumulation area 30B.

Figure 2A:
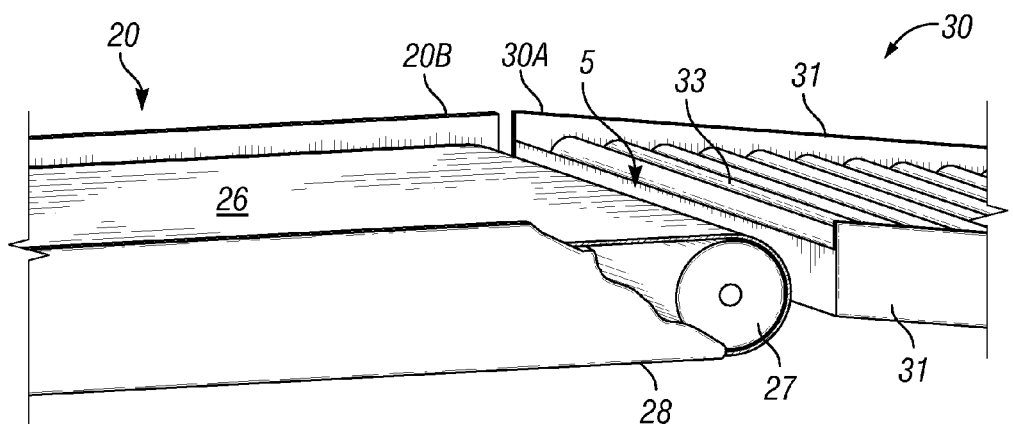
FIG. 2A is a perspective view of the gap intermediate the discharge end of a conveyor and the first end of a run-out ramp.

FIG. 2A is a perspective view of a gap 5 intermediate the discharge end 20B of a conveyor 20 and the first end 30A of the run-out ramp 30. The discharge end 20B of the conveyor 20 is positioned immediately adjacent to the first end 30A of the run-out ramp 30. The gap 5 between the discharge end 20B of the conveyor 20 and the first end 30A of the run-out ramp 30 is shown in FIG. 2A uncovered and open such that articles 2 (not shown in FIG. 2) placed on the conveyor belt 26 may be drawn into the gap 5 but for the installation of a seated transition plate (not shown in FIG. 2A; see FIG. 2B).

Figure 2B:
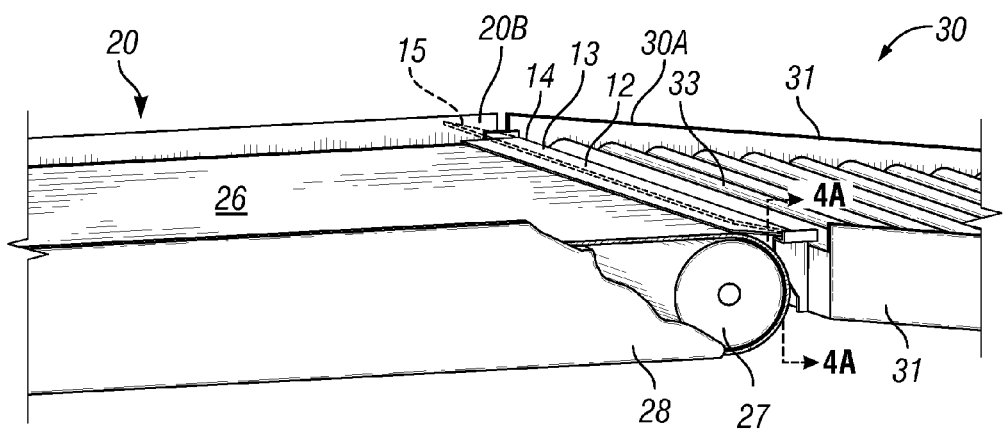
FIG. 2B is a perspective view of one embodiment of a transition plate assembly covering the gap intermediate the conveyor and run-out ramp of FIG. 2A.

FIG. 2B is a perspective view of one embodiment of a transition plate assembly covering the gap 5 intermediate the discharge end 20B of the conveyor and the first end 30A of the run-out ramp 30 of FIG. 2A. The transition plate assembly 12 comprises a transition plate 13 shown in the seated position to close the gap 5 and to thereby prevent articles (none shown in FIG. 2B) from being drawn into the gap 5 by movement of the conveyor belt 26 around the second roller 27 (not shown). The transition plate 13 is hingedly coupled to the transition plate assembly 12 by a hinge 14. FIG. 2B also shows, in dotted outline, the transition plate 13 pivoted to an unseated position 15 that may occur if the transition plate 13 is intentionally pivoted about the hinge 14 to obtain access to the gap 5 (See FIG. 2A), or if the transition plate 13 is inadvertently displaced from its unseated position by an article (not shown) drawn by the conveyor belt 26 into the gap 5 between the discharge end 20B of the conveyor 20 and the first end 30A of the run-out ramp 30.

Figure 3:
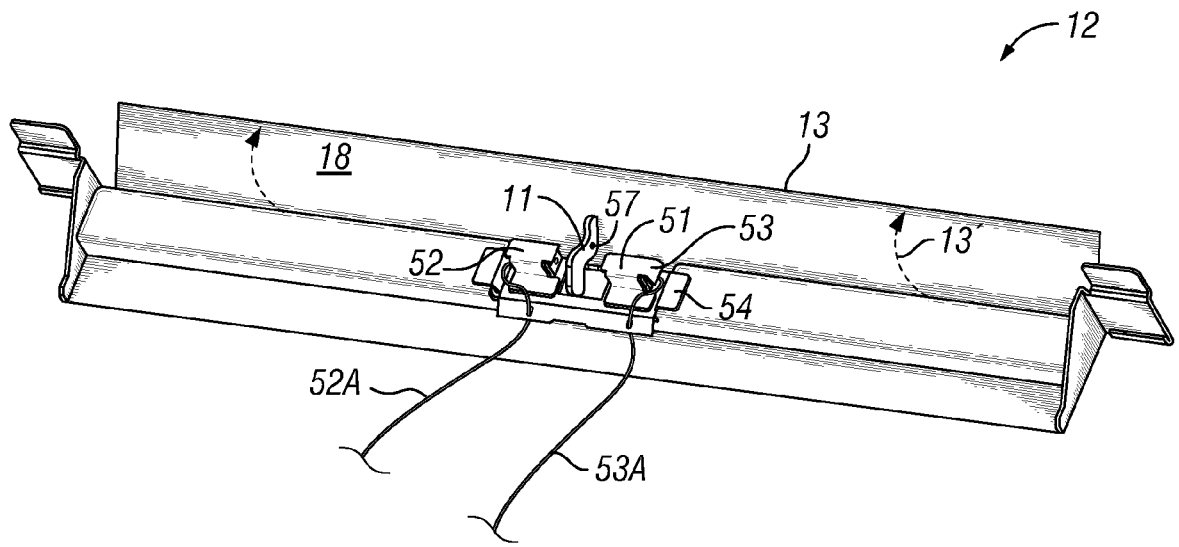
FIG. 3 is a perspective view of the transition plate assembly of FIG. 2B showing the transition plate, the fin plate, the light emitter, the light detector and the signal generator.

FIG. 3 is a perspective view of the transition plate assembly 12 of FIG. 2B with the transition plate 13 pivoted to the position in the direction of arrow 13' from its seated position shown in FIG. 2B to the unseated position 15 shown in dotted lines in FIG. 2B. The pivotal displacement of the transition plate 13 reveals a fin plate 11 having an aperture 57 therein, the fin plate 11 extending from the bottom surface 18 of the transition plate 13, and a position sensor assembly 54 coupled to the transition plate assembly 12. The position sensor assembly 54 comprises a light emitter 52 and a light detector 51 in a spaced-apart and aligned relationship to the light emitter 52, and a signal generator 53 disposed in communication with the light detector 51. The position sensor assembly 54 further comprises a power supply wire 52A to supply electrical current to the light emitter 52, and a signal wire 53A to deliver a signal from the signal generator 53 to a controller or processor 58 (not shown in FIG. 3; see FIG. 5) or to a drive motor 21 (not shown in FIG. 3; see FIG. 1).

The fin plate 11 in FIG. 3 is shown disposed intermediate the light emitter 52 and the light detector 51, and in a position to block light emitted from the light emitter 52 from being detected by the light detector 51. The position shown in FIG. 3 illustrates how the fin plate 11 protruding from the bottom 18 of the transition plate 13 may be positioned to prevent an enabling signal from being generated by the signal generator 54 and to prevent operation of the conveyor 20 (not shown in FIG. 3).

Figure 4A:
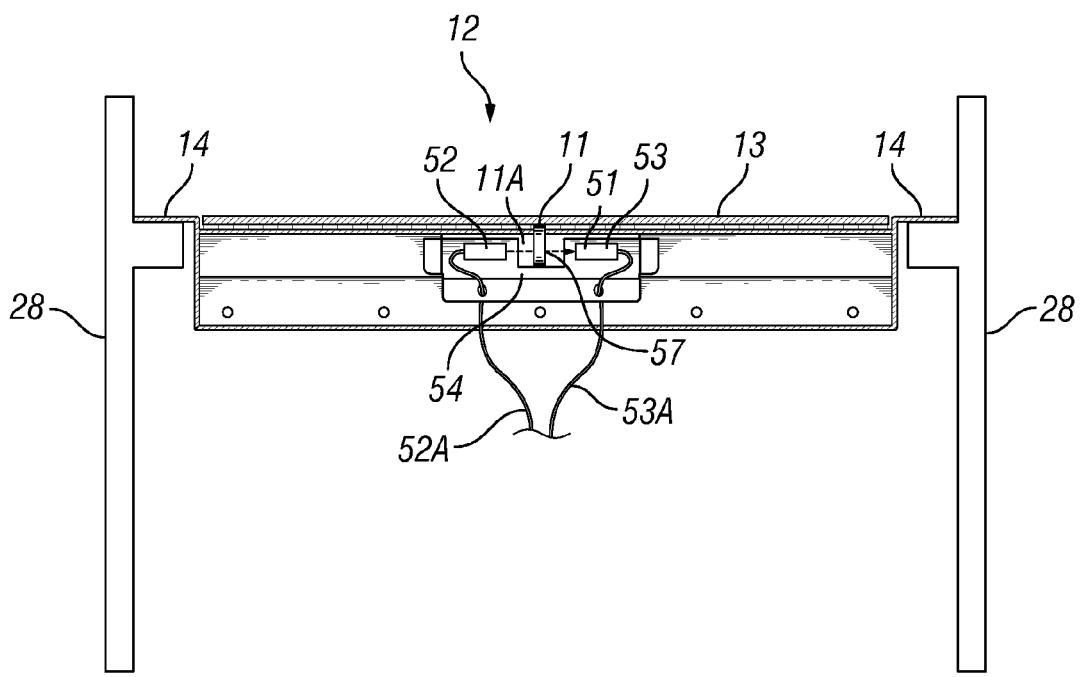
FIG. 4A is a cross-section elevation view of the transition plate assembly of FIG. 2B illustrating the seated position of the transition plate assembly and its components relative to the frame of the conveyor.

FIG. 4A is a cross-sectional elevation view of the transition plate assembly 12 of FIG. 2B illustrating the seated position of the transition plate 13 and the relative position of the position sensor assembly 54 relative to the transition plate assembly 13 and the frame 28 of the conveyor 20. The fin plate 11 extending from the bottom of the transition plate 13 is curved so that it remains disposed between the spaced-apart light emitter 53 and light detector 51 at all times, whether the transition plate 13 is in a seated position (as shown in FIG. 2B) or an unseated position (as shown in FIG. 3). In FIG. 4A, an aperture 57 in the fin plate 11 is aligned intermediate the light emitter 52 and the light detector 51. In this configuration, the aperture 57 in the fin plate 11 transmits (i.e., does not block) light emitted from the light emitter 52 therethrough to be detected by the light detector 51. The light detector 51, in response to detection of the light from the light emitter 52 communicates with the signal generator 53, and the signal generator 53 sends an enabling signal through signal wire 53A to the drive motor 21 (not shown in FIG. 4A—see FIG. 1) or to a controller or processor 58 (not shown in FIG. 4A—see FIG. 5).

Figure 4B:
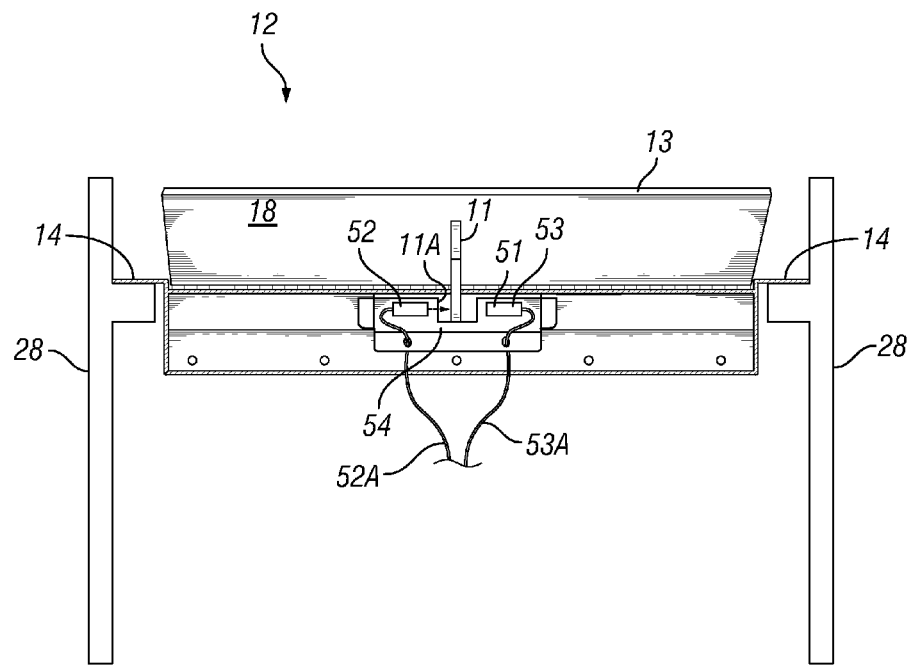
FIG. 4B is the cross-section elevation view of the transition plate assembly of FIG. 4A after the transition plate is pivoted about its hinge to an unseated position to automatically disable the conveyor.

FIG. 4B is a cross-sectional elevation view of the transition plate assembly 12 of FIG. 4A after the transition plate 13 is pivoted to an unseated position to automatically disable the conveyor 20. The fin plate 11 extending from the bottom 18 of the hinged transition plate 13 is angularly displaced relative to the position sensor assembly 54 so that the aperture 57 of the fin plate 11 is no longer aligned with the light detector 51 and the light emitter 52, and light emitted from the light emitter 52 is no longer detectable at the light detector 51 due to blockage of the emitted light by the non-apertured portion of the fin plate 11. It should be understood that all unseated positions of the transition plate 13 achievable using hinges 14 will similarly misalign the aperture 57 with the path between the light emitter 52 and the light detector 51 and thereby deactivate the conveyor 20. The range of motion of the transition plate is preferably limited so that the fin plate is always disposed between the light emitter and detector.

Figure 5:
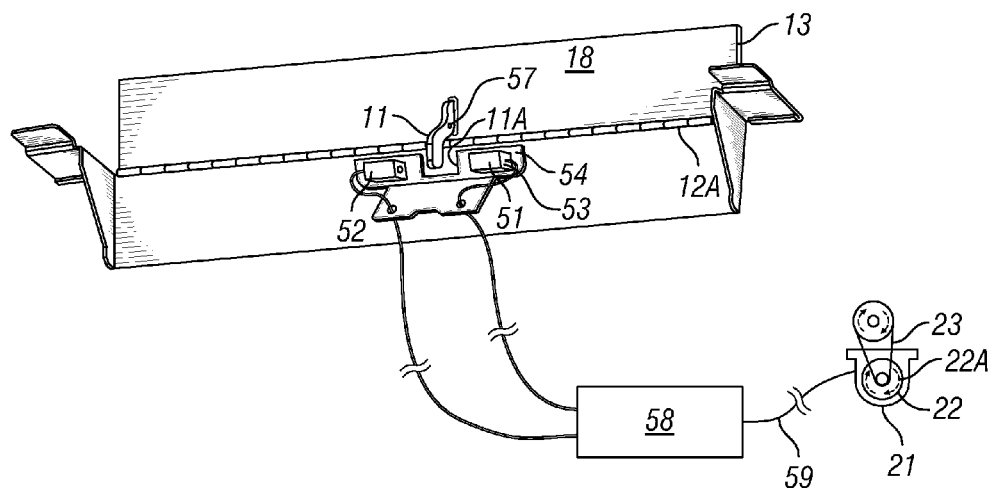
FIG. 5 is an isolated perspective view of the transition plate assembly of FIG. 3 illustrating the electronic connections to a processor that enables the drive motor of the conveyor.

FIG. 5 is an isolated perspective view of the bottom 18 of one optional embodiment of the transition plate 13 of a transition plate assembly 12 of the present invention having an apertured fin plate 11 extending therefrom. Also shown in FIG. 5 is a position sensor assembly 54 comprising a light emitter 52, a light detector 51 and a signal generator 53. A recess 11A in the position sensor assembly 54 may receive a portion of the fin plate 11 that is distal from the bottom 18 of the transition plate 13 when the transition plate 13 is pivoted on the hinges 14 (not shown) to a seated position.

An optional controller or processor 58 shown in FIG. 5 may be used to execute selected logic sequences. For example, a motor-enabling signal interrupt duration test may be implemented using the controller or processor to prevent an unwarranted deactivation of the conveyor 20 (not shown) resulting from a temporary obstruction of the light detected by the light detector 51. For example, if dirt, sugar, salt or some other granular material were to be discharged from the conveyor belt into the gap 5, and were to obstruct the light detector 51 or the light emitter 52 for a fraction of a second, the controller or processor 58 may be programmed to continue to send the enabling signal to the drive motor 21 via the enabling cable 59 until and unless the light detector 51 does not detect light from the light emitter 52 for a set duration of time. Similarly, the controller or processor 58 may continue to send the enabling signal when the transition plate is momentarily unseated (i.e., for a time period less than a setpoint), followed by an immediate re-seating, in order to avoid shutting down the conveyor for any incidental debris that easily passes under the transition plate.

Alternately or additionally, the processor 58 may impose a brief delay in restarting the conveyor after operation has been interrupted by the position sensor assembly 54. For example, after the position sensor assembly 54 suspends operation of the drive motor 21 due to interruption of the light detected at the light detector 51, the processor 58 may delay the sending of a re-enabling signal to the motor 21 via enabling cable 59 until a set duration of time, for example, three seconds, has elapsed after the light detector 51 first detects light emitted from the light emitter 52.

It should be understood that an embodiment of the transition plate assembly 12 adapted to cooperate with a processor 58 may be programmed to implement a customized logic sequence to control the operation of the conveyor.

Figure 6:
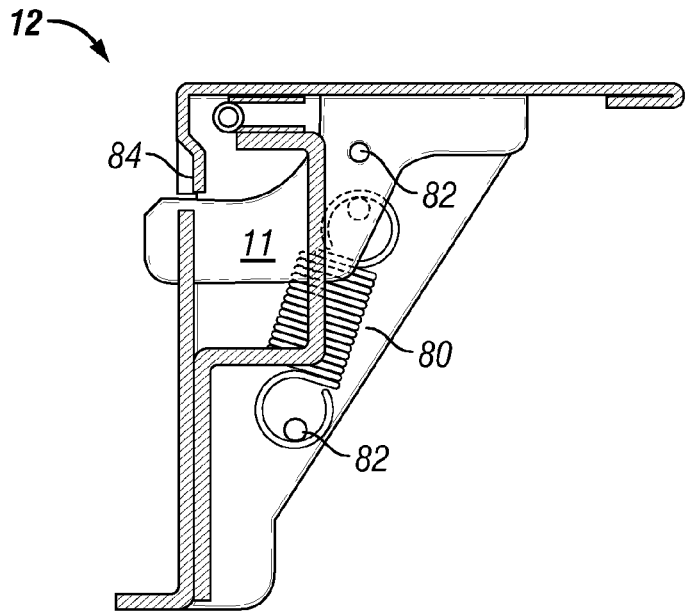
FIGS. 6 and 7 are cross-sectional side views of the transition plate assembly in the seated position and an unseated position, respectively.
Figure 7:
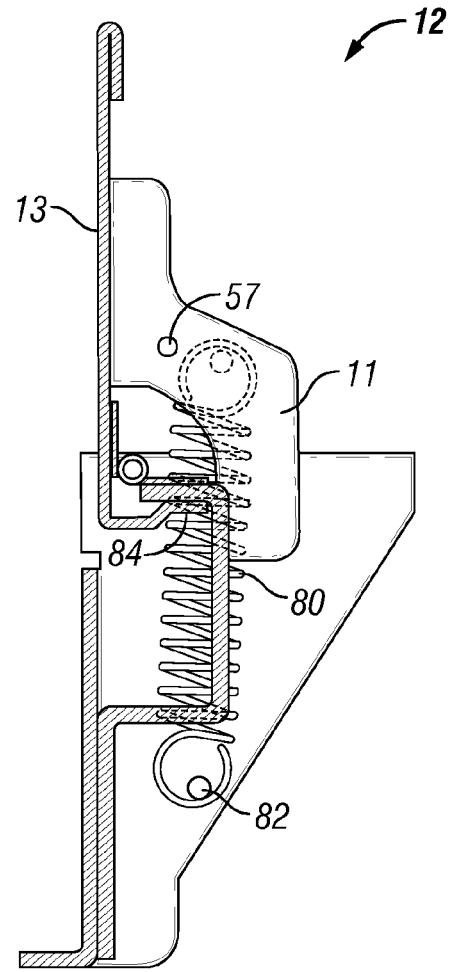

FIGS. 6 and 7 are schematic cross-sectional side views of the transition plate assembly in the seated position and an unseated position, respectively. In FIG. 6, a spring 80 is coupled between the transition plate 13 and a lower portion 82 of the assembly or bracket 12 in order to bias the transition plate toward the seated position, as shown. In this position, the aperture 57 will align with the emitter and detector (not shown). In FIG. 7, the transition plate 13 has been unseated by manually lifting the plate. Although the lifting force must overcome the biasing force of the spring 80, the spring force is preferably small since it is desirable for the transition plate to unseat easily so that damage to articles or personnel is avoided.

Furthermore, FIG. 7 also illustrates one embodiment of a transition plate 13 having a stop arm 84 that limits the transition plate's range of travel. Because there is a limit to the range of motion of the transition plate, the fin plate 11 can be designed so that it lies between the light emitter and light detector regardless of the exact position of the transition plate within that range of motion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus, comprising:
   a transition plate to cover at least a portion of a gap between a motor-driven conveyor and a run-out ramp;
   a hinge coupled to the transition plate to allow pivoting of the transition plate between a seated position substantially covering the gap and an unseated position providing access to the gap;
   a fin plate extending from a bottom side of the transition plate, the fin plate having an aperture therethrough;
   a light emitter and a light detector positioned in a stationary spaced-apart relationship on opposing sides of the fin plate and aligned to emit and detect light through the fin plate aperture only when the transition plate is in its seated position, and wherein the fin plate blocks the path between the light emitter and light detector throughout the range of hinged motion of the transition plate; and
   a signal generator coupled to the light detector for sending a motor-enabling signal while the aperture is positioned between the light emitter and the light detector.

2. The apparatus of claim 1, further comprising:
   a reset timer in electronic communication with the signal generator to delay sending the motor-enabling signal for a predetermined duration after initially detecting that the aperture is positioned between the light emitter and the light detector.

3. The apparatus of claim 1, further comprising:
   a controller receiving the motor-enabling signal and controlling the motor that drives the conveyor.

4. The apparatus of claim 1, wherein the controller determines the duration of an interruption in the motor-enabling signal and selectively disables the drive motor if the duration exceeds a set point.

5. The apparatus of claim 1, further comprising:
   a bracket secured to the run-out ramp adjacent the conveyor, wherein the bracket secures the hinge, the light emitter, and the light detector.

6. The apparatus of claim 5, wherein the run-out ramp is adjacent a discharge end of the conveyor.

7. The apparatus of claim 1, further comprising:
   a spring disposed to bias the transition plate toward the seated position.

8. The apparatus of claim 1, wherein the transition plate has a limited range of travel about the hinge.

9. The apparatus of claim 1, wherein the fin plate has a surface that is light absorbing.

\* \* \* \* \*